Oct. 19, 1926.
J. F. FLAHERTY
CHUCK
Original Filed July 12, 1920
1,603,531
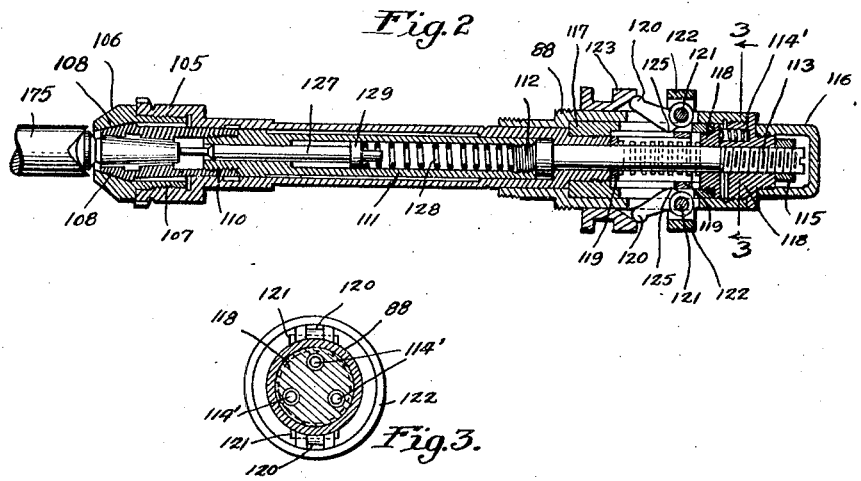
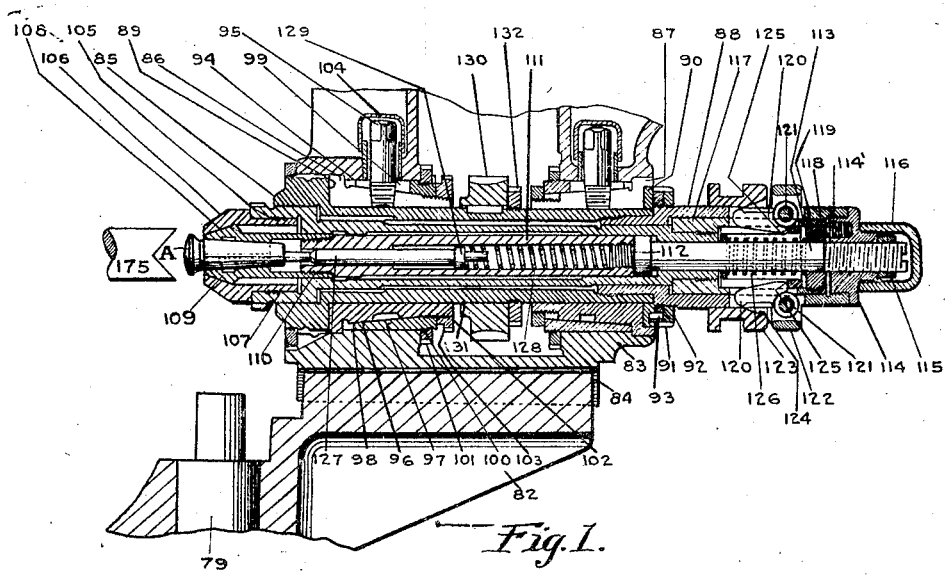
Inventor
Harold J. Kehoe, Executor of the
Estate of John F. Flaherty, Deceased
By
Attorney Patented Oct. 19, 1926.

1,603,531

UNITED STATES PATENT OFFICE.

JOHN F. FLAHERTY, DECEASED, LATE OF TOLEDO, OHIO; BY HAROLD J. KEHOE, EXECUTOR, OF TOLEDO, OHIO, ASSIGNOR TO THE BOCK BEARING COMPANY, OF TOLEDO, OHIO, A CORPORATION OF OHIO.

CHUCK.

Original application filed July 12, 1920, Serial No. 395,539. Divided and this application filed September 7, 1923. Serial No. 661,356.

This invention relates to chucks or work holders and the present application is a division of an earlier application No. 395,539, filed July 12, 1920.

One of the objects of the invention is to provide a chuck for holding a piece of work accurately in position to be operated upon by a grinding wheel or other device used, as a cutting means, on a machine with which the work holder is associated.

A further object of the invention is to provide a work holder adapted to automatically eject the work after it has been operated upon.

A further object of the invention is to provide a chuck especially adapted for use in a machine for grinding the heads of rollers for bearings.

One form of the invention is illustrated in the accompanying drawings of which Fig. 1 is a longitudinal section of the chuck and the parts of a grinding machine on which it is mounted; Fig. 2 is a longitudinal section through the spindle and chuck and showing the parts with the chuck open and ready to grip the article; and Fig. 3 is a transverse section on the line 3—3 of Fig 2.

Referring to the drawing, 79 indicates a vertical shaft suitably supported and having arranged thereon for swinging movement a bracket 82 on which a housing 83 is slidably mounted by means of the dovetail 84.

A hollow spindle 85 is mounted in bearings 86 and 87 in the housing 83 and has an extension 88 threaded into one end thereof. The opposite end of the spindle 85 is enlarged, to provide a thrust shoulder 89 which bears against one end of the bearing 86 and cooperates with the thrust collar 90. which is held on the spindle by means of the nuts 91 and 92 and which engages the end of the bearing 87, to hold the spindle against axial movement in either direction. A dowel 93 connects the thrust collar 90 with the nut 91 so as to cause the thrust collar to rotate with the spindle.

The bearings 86 and 87 are adjustable for wear so as to hold the spindle 85 against lateral movement. The same adjustment is used for both of the bearings 86 and 87 and, therefore, a description of one will be sufficient. A flange on the bearing cooperates with the shoulder 94 in the housing 83, to hold the bearing against axial movement in one direction. The bearing is split and in the split is provided a threaded opening for the tapered end of the screw plug 95, this screw plug positively holding the bearing against contraction, but, upon being backed out, will permit a certain amount of contraction, owing to the tapering of the end of the screw. The outer surface of the bearing is tapered, as indicated at 96, and has arranged thereon a sleeve 97 that is provided with a tapered bore and a cylindrical outer surface which fits the bore 98 of the housing 83. The sleeve 97 has a slot 99 through which the screw plug 95 projects and also has one end threaded, as indicated at 100, to receive the nut 101 which bears against a shoulder on the housing 83 and cooperates with the shoulder 94 to hold the bearing from axial movement in either direction. The bearing 86 has a threaded end 102 on which there is a nut 103 which bears against the end of the sleeve 97, to hold the latter against axial movement relative to the sleeve.

The construction just described enables the bearing 86 to be contracted on the spindle 85 to compensate for wear, and to make this adjustment, the screw plug 95 is backed out slightly and the nut 101 loosened. The nut 103 is then turned to force the sleeve 97 onto the bearing to contract the latter, the engagement of the flange on the bearing with the shoulder 94 holding the bearing against axial movement when this adjustment is made. When the bearing has been contracted sufficiently, the nut 101 is again tightened and the parts will be retained in their adjusted position. It will be understood that in making this adjustment, the screw plug 95 will be backed out only such an amount as will permit the required adjustment, so that when the adjustment is completed the screw plug will positively hold the split in the bearing with the desired amount of opening.

A cap 104 is arranged over the exposed end of the screw plug 95 to prevent the latter from being turned accidentally and to prevent dirt from getting into the bearing. Arranged within the spindle 85 and the extension 88, but rotatable therewith, is an axially shiftable tubular member or sleeve 105, one end of which is enlarged to receive the head 106 which has a screw threaded connection therewith at 107. The head 106 has a conical bore 108 which cooperates with the conical exterior of the split collet 109, this collet being adapted to receive the work A therein and securely hold it by its gripping action thereon. The collet 109 has a threaded connection at 110 with a tubular member 111, and the latter has a threaded connection at 112 with the rod 113. The rod 113 has its outer end threaded, so as to be adjustable in the cap 114 at the outer end of the spindle extension 88. A lock nut 115 is adapted to secure the rod 113 in its adjusted position and a cap 116 is arranged over the end of the rod 113 and the nut 115. The member 105 has an extension 117 screwed on the end thereof, and at the outer end of this extension, there is a plug 118 through which the rod 113 slides. A plurality of coil springs 114' are arranged between the cap 114 and the plug 118 and serve to move the sleeve 105 and head 106 so as to release the collet 109. A sleeve 119 is slidable axially within the extension 117 and this sleeve and the extension are provided with radial slots, to receive the wings 120, each of which has a pivot 121 transversely arranged in the spindle extension 88. A collar 122 is arranged on the extension 88 and protects the pivots 121. An axially shiftable collar 123 is arranged on the exterior of the spindle extension 88 and has cam surfaces 124 which cooperate with the wings 120, to move the latter inwardly, the wings also engaging abutments 125 on the sleeve 119, to move the latter axially against the pressure of a spring 126. The spring 126 is arranged within the sleeve 119 and bears against the internal flange at the end of the sleeve and against the plug 118.

A plunger 127 is slidably mounted in the member 111 and a spring 128, which bears on a collar 129, on the plunger 127 and on the end of the rod 113, normally presses the plunger against the work A, and when the collet 109 is expanded and the work thereby released, the plunger 127 serves to eject the work from the collet.

A driving gear 130 for the spindle 85 is keyed to the latter and held in position thereon by the shoulder 131 and the nut 132.

In the operation of the chuck, the spindle 85 is rotated continuously by means of the gear 130 and when the work A is inserted in the collet 109, the plunger 127 is pushed inwardly against the pressure of the spring 128 until the work reaches its proper position, when the collar 123 will be shifted to the position shown in the drawing, the inclined surfaces 124 drawing the wings 120 inward, and the wings, in turn, moving the sleeve 119 toward the right, and the latter, through the spring 126, drawing the sleeve 105 and the head 106 toward the right, so as to contract the collet 109 on the work and securely hold the latter. When the collar 123 is again shifted to the left, from the position shown in the drawing, the wings 120 will be allowed to swing outwardly and the springs 114' will move the sleeve 105 and head 106 to the left to effect the release of the collet 109 so that the plunger 127 can eject the work from the collet.

A reciprocating plunger 175, actuated by any suitable mechanism is arranged in axial alignment with the chuck to force the article A into the chuck against the tension of the spring 128, the movement of the plunger 175 toward the chuck being definitely limited to accurately position the article longitudinally of the chuck. The collar 123 is actuated in timed relation to the plunger 175 to grip the article as soon as it is positioned by the plunger.

Having thus described the invention, what I claim is:

In apparatus of the class described, the combination of a tubular member having a split collet on one end and a rod on the other end, a hollow spindle having an end wall in which said rod is adjustably secured, said collet having a conical exterior, a longitudinally slidable sleeve within said spindle and supporting said tubular member and having an end wall through which said rod extends, said sleeve having a conical inner surface cooperating with the conical exterior surface of said collet to contract the collet on the article to be held therein, a sleeve slidable within the first-mentioned sleeve, an actuating lever for moving the second-mentioned sleeve relatively to the first-mentioned sleeve, a spring surrounding said rod and cooperating with said sleeves to effect relative movements thereof in opposition to the movements effected by said lever, spring means between said end walls for moving the first-mentioned sleeve in the direction which releases said collet, means for actuating said lever, and a spring actuated plunger within said member for ejecting the article from said collet.

In testimony whereof I affix my signature.

HAROLD J. KEHOE.
*Executor of the Estate of John F. Flaherty, Deceased.*